(12) United States Patent
Divan et al.

(10) Patent No.: US 7,129,599 B2
(45) Date of Patent: Oct. 31, 2006

(54) DUAL FEED POWER SUPPLY SYSTEMS WITH ENHANCED POWER QUALITY

(75) Inventors: Deepakraj M. Divan, Madison, WI (US); Robert Schneider, Madison, WI (US); William Kranz, Madison, WI (US)

(73) Assignee: Soft Switching Technologies Corporation, Middleton, WI (US)

( * ) Notice: Subject to any disclaimer, the term of this patent is extended or adjusted under 35 U.S.C. 154(b) by 546 days.

(21) Appl. No.: 10/271,330

(22) Filed: Oct. 15, 2002

(65) Prior Publication Data

US 2004/0070278 A1 Apr. 15, 2004

(51) Int. Cl.
*H02J 7/04* (2006.01)
(52) U.S. Cl. ...................................... 307/65
(58) Field of Classification Search ............ 307/65
See application file for complete search history.

(56) References Cited

U.S. PATENT DOCUMENTS

| | | | |
|---|---|---|---|
| 3,714,452 A | 1/1973 | Williamson | |
| 4,340,823 A * | 7/1982 | Miyazawa | 307/66 |
| 4,761,563 A | 8/1988 | Ross et al. | |
| 4,879,624 A | 11/1989 | Jones et al. | |
| 5,138,184 A | 8/1992 | Keefe | |
| 5,182,464 A | 1/1993 | Woodworth et al. | |
| 5,198,698 A | 3/1993 | Paul et al. | |
| 5,311,066 A | 5/1994 | Malloy et al. | |
| 5,386,147 A | 1/1995 | Bonneau et al. | |
| 5,579,197 A * | 11/1996 | Mengelt et al. | 361/93.4 |
| 5,698,969 A | 12/1997 | Gyugyi | |
| 5,745,356 A * | 4/1998 | Tassitino et al. | 363/71 |
| 5,939,799 A | 8/1999 | Weinstein | |
| 6,023,106 A * | 2/2000 | Abraham | 307/3 |
| 6,031,298 A | 2/2000 | Lo et al. | |
| 6,118,676 A | 9/2000 | Divan et al. | |
| 6,154,378 A * | 11/2000 | Peterson et al. | 363/37 |
| 6,172,432 B1 | 1/2001 | Schnackenberg et al. | |
| 6,184,593 B1 * | 2/2001 | Jungreis | 307/64 |
| 6,191,500 B1 | 2/2001 | Toy | |
| 6,465,911 B1 * | 10/2002 | Takeda et al. | 307/70 |
| 6,515,655 B1 * | 2/2003 | Thornblad | 345/211 |
| 6,630,752 B1 * | 10/2003 | Fleming et al. | 307/64 |

OTHER PUBLICATIONS

Deepak Divan, "Power Quality and 9s." The Huber Mills Digital Power Report. Apr. 2001. Gilder Publishing LLC.

* cited by examiner

*Primary Examiner*—Robert L. Deberadinis
*Assistant Examiner*—Dru Parries
(74) *Attorney, Agent, or Firm*—Foley & Lardner LLP

(57) ABSTRACT

Dual feed power supply system provides high reliability of a dual utility feed, with minimal interruptions in power supplied to critical loads during switching, and compensation for voltage sags occurring on the primary power feed. AC input buses are connected through a transfer switching apparatus to phase lines of a distribution bus. The transfer switching apparatus has a first input terminal connected to one of the phase lines of the first input bus and a second input terminal connected to one of the phase lines of the second input bus, and an output terminal connected to one of the phase lines of the distribution bus. Input switches allow switching from one or the other of the AC input buses to the distribution bus, with a fast transfer switch used to interrupt the supply of power from the input buses to the distribution bus during switching of the input switches.

38 Claims, 5 Drawing Sheets

DUAL FEED POWER SUPPLY SYSTEMS WITH ENHANCED POWER QUALITY

FIELD OF THE INVENTION

This invention pertains generally to the field of electrical power supply systems and particularly to high reliability power systems for critical loads.

BACKGROUND OF THE INVENTION

Electrical power quality and reliability are critical issues for many electrical power consumers. Computer systems and industrial processing operations can be adversely affected by momentary power disturbances, such as short-term power interruptions and sags, as well as by longer term power outages. Various approaches have been taken to improve quality and reliability. Individual pieces of critical equipment, such a servers, personal computers and other smaller computer systems may be adequately protected by uninterruptible power supplies (UPS) which both condition the power supplied to the consuming equipment and provide short-term backup power in case of a total power outage. Critical power consuming facilities such as hospitals and some industrial plants may have standby power generating equipment which is activated when the main utility power completely fails so as to ensure continued supply of power for as long as necessary to the critical loads. Some large scale electric power consumers that require very high reliability power—for example, semiconductor processing facilities—may be supplied with two independent distribution feeds from the power utility. The feeds are provided from two separate distribution grids, so that a fault occurring on one grid is usually not correlated with a fault on the other grid, making it highly improbable that both utility feeds will see an interruption at the same time. Thus, if a problem is encountered on one utility feed, a fast transfer to the other utility feed allows reliable power to be maintained to the critical loads. Such systems use an open or a closed transition transfer switch to switch power to the facility between the two utility feeds. This approach to providing premium power reliability has been utilized by a variety of large power consumers such as semiconductor and automotive manufacturing plants and large computer data centers.

Although dual utility feed systems do provide relatively high power reliability, power quality problems can still be encountered that are particularly serious for information technology and automated manufacturing processes. One problem relates to the interruption caused by the transfer from one utility feed to the other. A short interruption associated with transferring from one feed to another can result in a long shutdown of a critical industrial process or a computer system, essentially causing an interruption in the utilization of the critical load even though there is no long-term interruption in the supply of power. Relatively slow electro-mechanical transfer switches have the lowest cost and are currently an industry standard, but the use of such switches has the greatest potential for interruption of the power supplied to a critical load and the disruption of the operation of the load. One approach to addressing this problem is by the use of faster transfer switches, including static transfer switches (available from several manufacturers such as Cyberex and Silicon Power), and fast electro-mechanical switches (available, for example, from vendors such as Joslyn). While faster static switches can carry out transfers relatively rapidly to minimize the interruption of the power supplied to the load, the cost of switching systems incorporating such switches is significant.

Another power quality problem which is not well addressed by dual utility feed systems, even with fast transfer switches, results from voltage sags in the power being supplied from the active utility feed to the critical load. The transfer switching system can be set to switch from the sagging utility feed to the other utility feed if the sag becomes significant enough, but with an attendant potential interruption in the power supplied to the load while switching takes place. Thus, it is generally preferable not to trigger a transfer during relatively small voltage sags. However, a voltage sag which is not significant enough to trigger a switch may still affect the performance of the equipment being supplied with the sagging power. Moreover, a significant percentage of voltage sags result from substantial power system faults which cause the sag to propagate over large areas of the utility grid, including the transmission grid. In such cases, even though there may not be a complete outage, the disturbance can extend to both of the utility feeds, and switching from one utility feed to the other does not eliminate the sag problem for the customer.

SUMMARY OF THE INVENTION

In accordance with the invention, a dual feed power supply system provides the high reliability of dual utility feed power systems with minimization of interruptions in the power supplied to critical loads during switching from one power feed to the other. The invention may be utilized to compensate for momentary disruptions and voltage sags occurring on the primary power feed, or even on both power feeds, to maintain the output voltage to the critical load at nominal levels to minimize disruption of the functioning of the critical loads.

A dual feed power supply system in accordance with the invention typically will include a first AC input bus and a second AC input bus, which may be single phase or polyphase. For a three phase system, each input bus has three phase lines. The first and second input buses may be provided with power from two independent utility feeds through step-down transformers so that the voltage levels on the input buses are at the desired distribution voltage level to be applied to an AC distribution bus within the facility receiving power. Where two independent utility feeds provide power to the first and second AC input buses, power is available to be drawn from either bus during normal operation. The present invention may also be utilized in power systems in which one of the AC input buses is provided with power from a power utility while the other AC input bus is connected to a standby generator that is powered up during long-term power outages occurring on the utility. For each of the three phases of the input buses and a distribution bus, a transfer switching apparatus is connected to receive power from phase lines of the two AC input buses and is connected to supply power to a phase line of the AC distribution bus. The transfer switching apparatus of the present invention normally supplies power from the first of the AC input buses to the distribution bus when normal power is available on the first AC input bus, and switches to supply power without interruption from the second AC input bus to the distribution bus during a failure of the power supplied to the first input bus. Furthermore, in accordance with the invention, the transfer switching apparatus may draw power from either or both of the AC input buses to maintain the voltage level of the output power provided to the distribution bus at a nominal voltage level despite sagging voltages on one or both of the AC input buses.

Each of the transfer switching apparatuses of the present invention includes a first input terminal and a second input terminal, each of which is provided with AC power from one of the phase lines of the two AC input buses (for a polyphase system), and also includes an output terminal that is connected to one of the phase lines of the distribution bus. A first input switch is connected between the first input terminal and a junction node and a second input switch is connected between the second input terminal and the junction node. The input switches may be conventional electro-mechanical switches or bidirectional static switches. The input switches are responsive to control signals to open and close, with the switches being alternately opened and closed so as to prevent back flow of power from one input bus to the other—e.g., with the first input switch being normally closed and the second input switch being normally open. A fast bi-directional transfer switch may be connected between the junction node and the output terminal and is responsive to control signals to open and close the transfer switch. A first rectifier is connected to the first input terminal to receive AC power therefrom and provide DC output voltage to a DC bus. A second rectifier is connected to the second input terminal to receive AC power therefrom and provide DC voltage to the DC bus in parallel with the DC voltage provided by the first rectifier. The first and second rectifiers are connected to the first and second input terminals independently of the first and second input switches so that the rectifiers receive power even if the input switches are open. A DC electrical storage device is connected to the DC bus to receive DC power therefrom and deliver DC power thereto. In accordance with the invention, the DC storage device may comprise a passive capacitor which provides sufficient energy storage momentary interruptions on both input buses to provide short-term compensation for voltage sags. The energy storage capacitor preferably comprises two capacitors connected together at a node, with the node connected to a common neutral line that provides a current return path for power supplied to the first and second input terminals. An inverter is connected to the DC bus and has an AC output connected to the output terminal. The inverter is responsive to control signals to provide AC output voltage to the output terminal.

During normal operation, the bi-directional transfer switch is closed and power is delivered directly from the first input bus to the output bus through the transfer switch. When the voltage on the first input bus is interrupted, such as because of a power outage on the utility feed connected to the first input bus, a switching sequence is carried out in which the inverter is turned on and the bi-directional transfer switch is commutated by the inverter. The inverter supplies power to the output terminal at substantially the same phase, frequency and voltage level as the input power that had been supplied from the first input bus before the power fault. The first input switch is then opened to electrically isolate the transfer switching apparatus from the first utility bus, whereafter the second input switch is closed. After closure of the second input switch, the fast bi-directional transfer switch is then closed while the inverter is turned off so that power is now supplied from the second input bus through the transfer switch to the output terminal. Because of the power provided from the inverter during the switching interval, essentially no interruption in the output voltage provided to the critical load need occur.

During sags of voltage on the first input bus, the system may be operated to open the bi-directional transfer switch and simultaneously turn on the inverter to supply output voltage from the inverter to the output terminal at the desired nominal output voltage level so that the critical load never sees the sag in voltage. As long as power is available at the first input bus, even though at lower than nominal voltage level, power may still be drawn by the transfer switching apparatus from the first input bus to supply the power to the output terminal at the higher voltage levels. In addition, if power is available on the second input bus, as it would be if it is connected to a second utility feed, power can also be drawn from the second utility bus through the transfer switching apparatus to supply power to the load at the nominal output voltage level. In this manner, not only is the output voltage to the load compensated to remain at nominal voltage levels despite sags on the main utility feed, but the need to switch between utility feeds is minimized since power can continue to be supplied to the load even during significant power sags on the first input bus (e.g., to 60% of nominal voltage or lower) that would otherwise require a switch to the second input bus. In this manner, the potential for interruptions because of switching between the input buses can be significantly reduced.

The present invention may be implemented utilizing a minimum number of relatively low cost components for the rectifiers, DC energy storage, and inverter. If the transfer switching system is intended to provide compensation for short-term interruptions and sags in power lasting in the range of a few seconds or less, a passive capacitor may be utilized for DC power storage. The capacitor is charged with rectified power from the AC input buses through rectifier diodes, and it supplies power to the DC bus to which the capacitor is connected. The inverter in such cases may be formed of switching devices, such as power IGBTs, which have a rating selected to be sufficient to provide power from the inverter during the switching intervals of a few seconds or less and to provide the sag compensation for a relatively short duty cycle. Because the rating required for such components is lower than would be needed for continuous duty, component costs can be minimized. The invention may also be implemented, if desired, utilizing components which are rated to provide longer term power to the load so that the transfer switching apparatus can function, with the use of a long-term energy storage device such as a battery, flywheel, etc., to provide an uninterrupted supply of power to the load during longer term outages.

Further objects, features and advantages of the invention will be apparent from the following detailed description when taken in conjunction with the accompanying drawings.

DETAILED DESCRIPTION OF THE INVENTION

Figure 1:
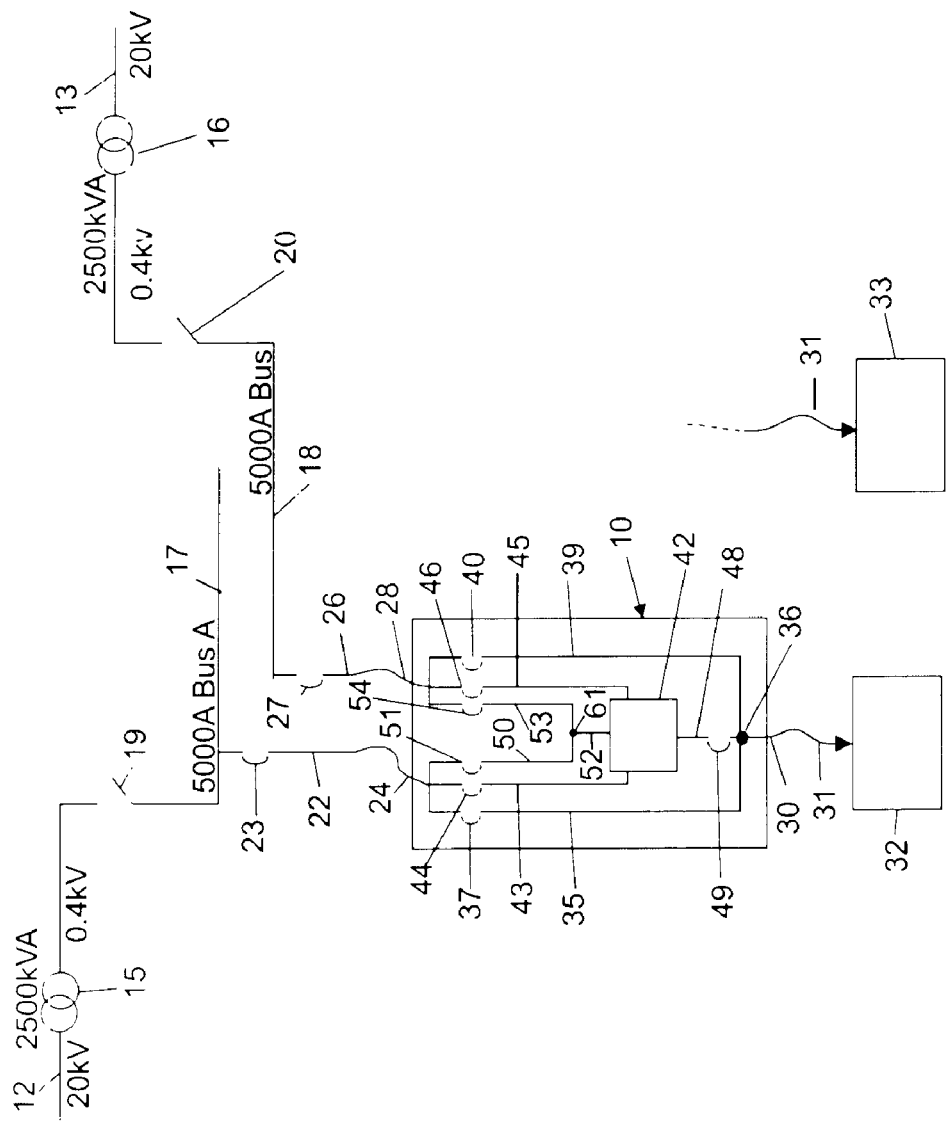
FIG. 1 is a schematic diagram of a dual feed power supply system incorporating the present invention.

With reference to the drawings, a schematic system diagram for a dual utility power supply system is shown generally in FIG. 1 incorporating transfer switching apparatus 10 in accordance with the invention. For purposes of illustrating the power system architectures in which the present invention may be utilized, two 20 kV utility feeds 12 and 13 are shown in FIG. 1 coupled through step-down transformers 15 and 16 to two 480 V, 4,000 amp AC input buses 17 and 18. Conventional main tie breaker switches 19 and 20 may be provided in the connecting lines between the transformer 15 and the bus 17 and between the transformer 16 and the bus 18, respectively. It is understood that the lines labeled 17 and 18 in FIG. 1 represent conventional three-phase low voltage power distribution buses. However, it is understood that the present invention may be utilized with single phase systems or in systems with more than three phases. Conductors 22 with a breaker switch 23 connected therein are connected from the AC input bus 17 to a first input terminal 24 of the switching apparatus 10, and conducting lines 26 with a breaker switch 27 connected therein are connected to a second input terminal 28 of the transfer switching apparatus 10. The transfer switching apparatus 10 has a single output terminal 30 connected via a line 31 to a distribution bus represented at 32 in FIG. 1 and ultimately to consuming equipment. For purposes of illustration, only a single transfer switching apparatus 10 is shown connected between the AC input buses 17 and 18 and the AC output distribution bus 32, providing connection for a single phase system, or for one of the phases of a three-phase supply system, with similar transfer switching apparatus being provided for the other two phases of a three-phase power system. Power may be drawn during normal operation from both of the buses 17 and 18 by having two sets of output distribution buses 32 and 33, one of which normally is supplied with power from the first AC input bus 17 (e.g., the bus 32) and the other of which (e.g., the bus 33) is normally supplied with power from the second AC input bus 18.

As illustrated schematically in FIG. 1, the transfer switching apparatus 10 provides redundant automatic bypass power flow paths from its two input terminals 24 and 28 to its output terminal 30. The power flow paths include a direct conducting line 35 from the first input terminal 24 to an output connection node 36 through a switch 37, and a direct conducting line 39 from the second input terminal 28 to the output connection node 36 through a switch 40. The output connection node 36 is connected to the output line 31 at the output terminal 30. The direct conducting lines 35 and 39 provide redundant conducting paths from the input terminals 24 and 28 to the output terminal 30 to ensure that power connections could be made from one or the other of the input AC buses 17 or 18 to the distribution bus 32 even if other active components of the switching apparatus 10 fail. The switching apparatus 10 further includes a power module 42 which receives power from the input terminal 24 on a conducting line 43 through a switch 44, and which receives power on a conducting line 45 through a switch 46 from the input terminal 28. The power module 42 provides output power on an output line 48 through an output switch 49 to the output connection node 36 and thence through the output terminal 30 and output line 31 to the distribution bus 32. The power conversion and storage module 42 is further connected to the first input terminal 24 via a conducting line 50 and a switch 51, and is connected to receive power from the second input terminal 28 via a conducting line 53 and a switch 54. The lines 50 and 53 are connected together at a junction node 61 to a single conducting line 52 that supplies the module 42. Because one or the other of the switches 51 and 54 is always open, the two utility feeds are always isolated from one another even though they are connected together to the line 52.

The operation of the switching apparatus 10 is summarized as follows. During normal availability of power on the two main feeds 12 and 13, the switches 19 and 20 are both closed and the input buses 17 and 18 are supplied with power. Both of the breaker switches 23 and 27 are also closed, so that power is provided to both of the input terminals 24 and 28 of the switching apparatus 10. The switches 37 and 40 are both normally open and the output switch 49 is normally closed, so that power is provided to the output terminal 30 and thence to the distribution bus 32 through the power module 42. Both of the switches 44 and 46 may be closed so that power is provided from both of the input terminals 24 and 28 to the power module 42 on the lines 43 and 45. One or the other of the switches 51 and 54 is closed and the other is open, so that power is provided to the module 42 via the lines 50 and 53 from only one of the input terminals 24 and 28, and thus from only one of the input AC buses 17 or 18. For example, the switch 51 may be closed and the switch 54 open so that power is provided only from the input bus 17 to the power module on the line 52. It is understood that there is at least one switching apparatus 10 connected from the AC bus 17 for each one of the three phases of the AC input bus for a three phase system, and which is connected to one of the three phases of the distribution bus 32. Similarly, a switching apparatus 10 may be connected between each of the phases of the AC input bus 18 and each of the three phases of the AC distribution bus 33. In this manner, the distribution bus 32 normally receives power from the first AC input bus 17 and the distribution bus 33 normally receives power from the second AC input bus 18.

With the switching apparatus 10 shown in FIG. 1 normally assumed to be providing power from the AC input bus 17 to the distribution bus 32, if the power on the distribution bus 17 completely fails or sags to an unacceptable voltage level, while acceptable power remains available on the second AC input bus 18, the switching apparatus 10 operates by opening the switch 51 to temporarily interrupt the supply of power from either of the input buses to the distribution bus 32. While the switch 51 is being opened and during the interim period while both of the switches 51 and 54 remain open, the power module 42 is operated to supply power to the output terminal 30 at a phase, frequency and voltage level that corresponds to the voltage that was available before the fault on the AC input bus 17. The switch 54 is then closed so that power is provided from the AC input bus 18 to the module 42, which connects this power directly to the output terminal 30 to supply the distribution bus 32. Generally, the phase and frequency of the AC input power normally provided from the utility on the AC input buses 17 and 18 is sufficiently close that substantially no interruption in the waveform of the AC power supplied to the distribution bus 32 occurs during any of the switching events. If there are significant differences between the phase or frequency of the power on the two buses 17 and 18, the power module 42 may transition to synchronize to the phase and frequency of the bus 18 before connecting it to the output. Where a standby generator is connected to the second AC input bus 18, the generator can be synchronized to the phase and frequency of power supplied from the power module 42 before the switch 54 is closed. After normal power returns to the AC input bus 17, the process is reversed, with the switch 54 being opened. During an interim period before the switch 51 is closed, power is provided from the power module 42, whereafter the switch 51 is closed to again supply power directly from the AC input bus 17 through the power module 42 to the output terminal 30 and thence to the output distribution bus 32.

Potentially disruptive power quality events can occur on the main utility feeds 12 and 13 that do not result in complete loss of power from one or the other of the utility feeds. For example, the power provided on the utility feed 12, and thus on the AC input bus 17, may sag from the nominal voltage level but power will still be available to be drawn from the utility power mains. In accordance with the present invention, under such conditions, the switch 51 remains closed so that power continues to be supplied from the AC bus 17, and power is drawn on the lines 43 or 45 or both to the power module 42, which supplies the output power to the output terminal 30 so that the voltage at the output terminal 30 is maintained at essentially the nominal output voltage level. Under these conditions, some power may be drawn from the second AC power input bus 18 to supplement the power available from the primary AC input bus 17. Even if both of the AC input buses 17 and 18 experience a sag in their voltage levels from nominal voltage levels, the power module 42 may still be able to draw sufficient power from one or both of the AC input buses to bring the output voltage level at the output terminal 30 to the nominal voltage level.

Each of the switching apparatus 10 for the three phases that draw primary power from the AC input bus 17 to provide power to the output bus 32 function in the same manner. Similarly, each of the switching apparatus 10 which are connected for each of the three phases of the input bus 18 to the distribution bus 33 function in a similar manner, with the AC input bus 18 now being the primary input power bus and the AC input bus 17 being the secondary input power bus.

Although the invention has been illustrated above with respect to dual utility feed power systems, the second power bus 18 may be supplied with power from sources other than power utilities, for example, from a standby generator that is operated during outages on the utility feeding the main bus 17.

Figure 2:
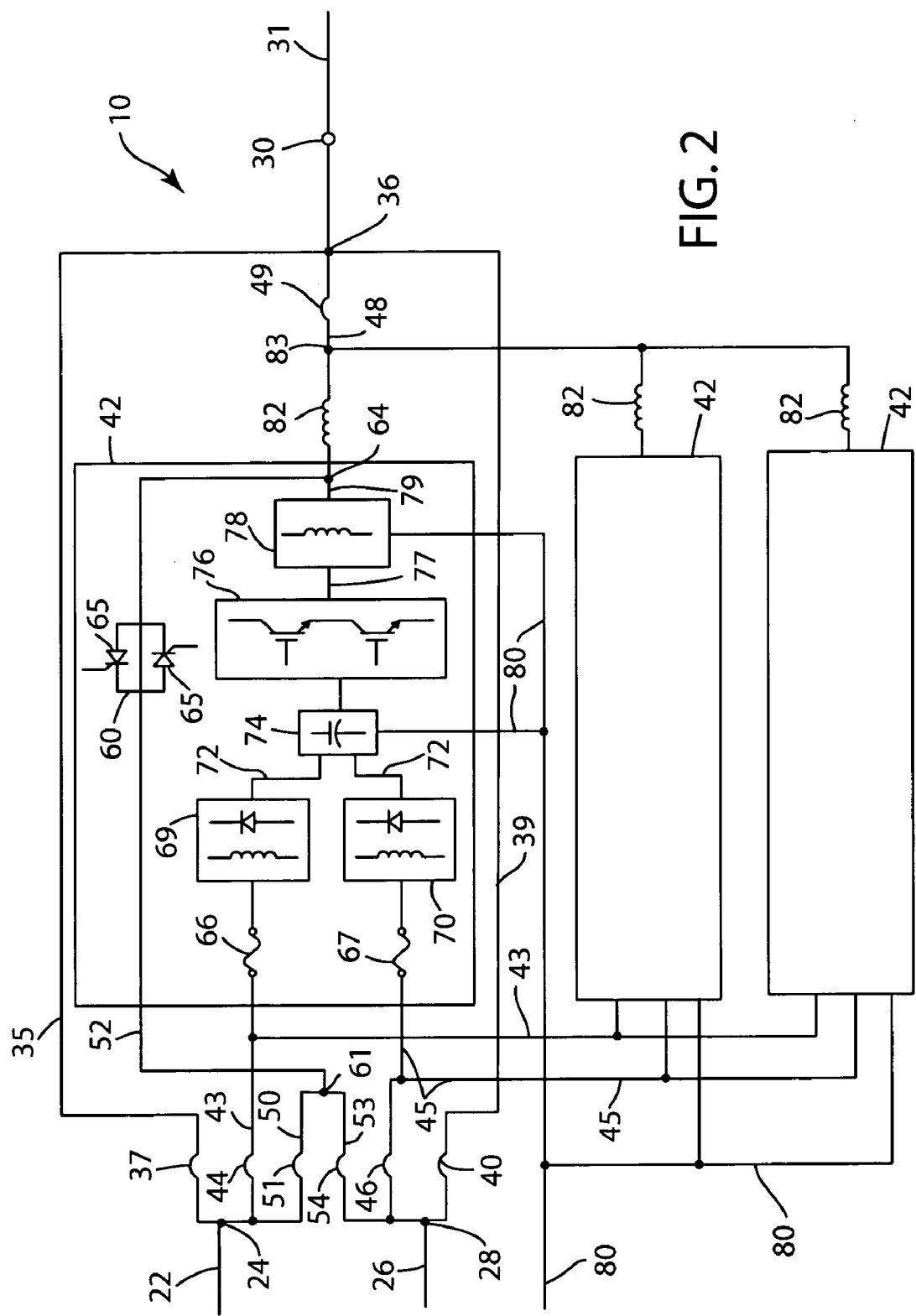
FIG. 2 is a schematic diagram of a transfer switching apparatus for dual feed power supply systems in accordance with the invention.

A block diagram illustrating the components of an exemplary implementation of the transfer switching apparatus 10 of the invention is shown in FIG. 2. The power module 42 functions to direct power received at the first input terminal 24 from the primary input line 22 to the output terminal 30 during normal availability of power, to provide a fast switching of the supply of power from the input terminal 24 to the input terminal 28 on occurrence of a fault primary on the primary bus 17, with power supplied from the power module during the switching interval, and to compensate for sagging voltages on the primary input bus 17 by drawing power from one or both of the input buses 17 and 18. The exemplary power module 42 illustrated in FIG. 2 includes a fast bi-directional transfer switch 60 connected in the line 52 from a junction node 61 at which the input lines 50 and 53 are connected together. The bypass line 52 with the transfer switch 60 in it is connected to a power module output node 64. The bi-directional transfer switch 60 may be composed of back-to-back paralleled thyristors 65 as illustrated, but other types of bi-directional controllable fast static switches may be utilized as desired. As noted above, the switches 44 and 46 are normally closed so that power is provided from the lines 22 and 26 to the power module 42 on both of the lines 43 and 45 during normal operation. The power on the lines 43 and 45 is provided (preferably through fuses or circuit breakers 66 and 67) to AC to DC rectifiers 69 and 70, respectively. The DC output from the rectifiers 69 and 70 is provided to a DC bus 72 to which is connected a DC electrical storage device 74, preferably a storage capacitor or capacitors. The DC power on the DC bus 72 is provided to an inverter 76 which provides a controlled AC output on a line 77 to a transformer and filter 78, the output of which is provided on a line 79 to the power module output node 64. A neutral line 80 may be connected to the DC bus capacitor(s) 74 and to the filter/transformer 78 to provide a current return path for the lines 22 and 26, as discussed further below. To accommodate higher current output requirements without increasing the ratings of the components of an individual power module 42, multiple power modules 42 may be connected in parallel as illustrated in FIG. 2, with the outputs of each of the additional power modules 42 being connected through an inductor 82 to a common node 83 to facilitate load sharing among the multiple power modules 42.

Figure 3:
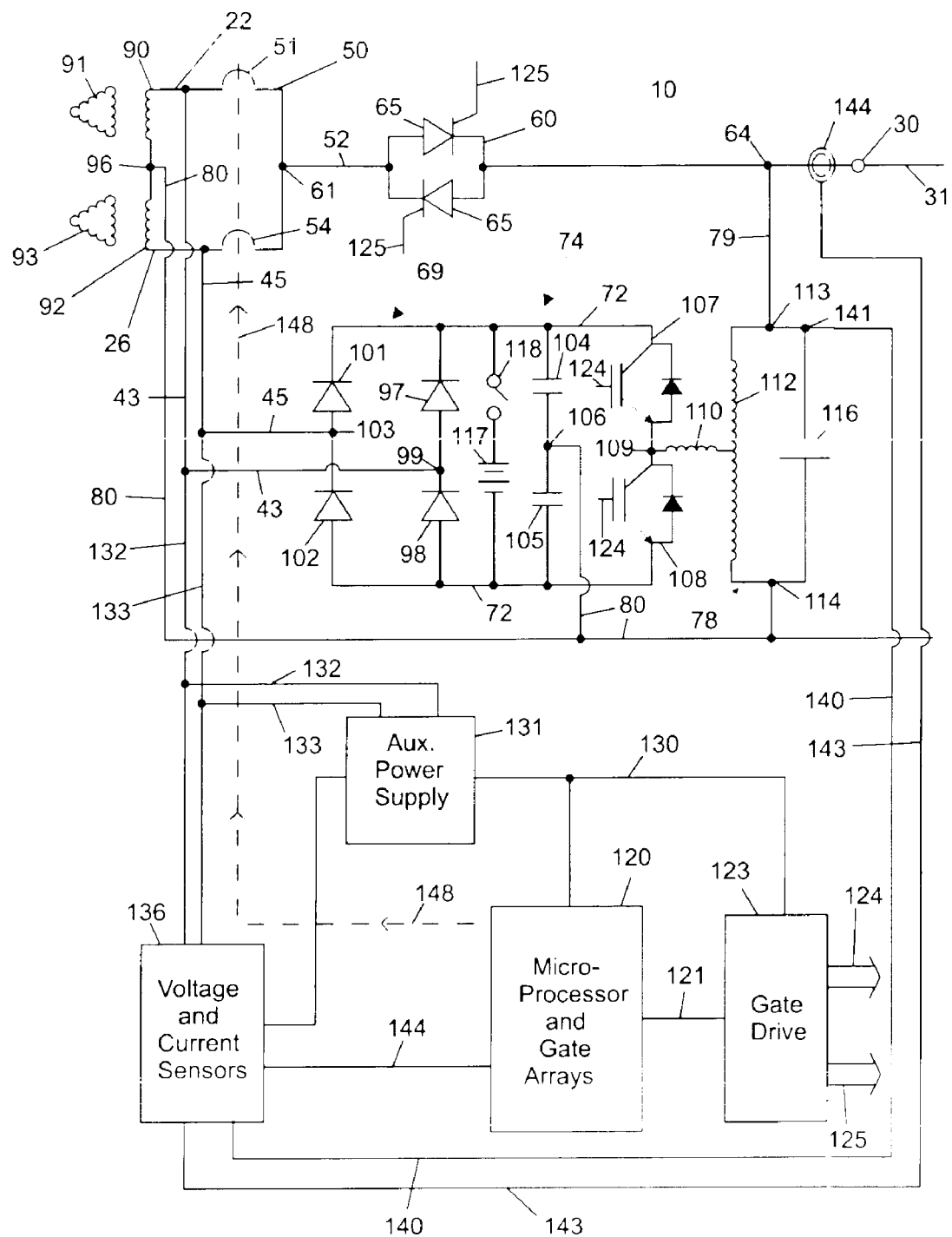
FIG. 3 is a schematic circuit diagram of the transfer switching apparatus of the invention showing a preferred circuit implementation thereof.

A suitable implementation of the power modules 42 may be similar to that described in U.S. Pat. No. 6,118,876 to Divan, et al., incorporated herein by reference, and such power modules are available commercially as DySC7 dynamic sag corrector modules from Soft Switching Technologies Corporation, Middleton, Wis., with such modules constructed to share a common neutral 80, as illustrated in FIGS. 2 and 3. The power modules 42 are controlled to supply power through the bypass line 52 and the bi-directional transfer switch 60 during normal operation, and to store energy in the energy storage capacitors 74, although other DC energy storage devices such as a battery, flywheel energy storage, superconducting magnet storage, etc. may be utilized. Under normal conditions, the inverter 76 is inactive and no power is supplied through the transformer 78 to the power module output node 64. During a switching event, the transfer switch 60 is controlled to rapidly open to interrupt the supply of power on the bypass lines 52 to the power module output node 64, and the inverter 76 is generally turned on to provide AC power at the same phase and frequency to the output node 64 as was provided on the line 52 before the transfer switch 60 was opened, so that substantially no interruption of the output voltage waveform is experienced in the power provided through the output terminal 30 on the output line 31. The turn-on of the inverter 76 may also be utilized to commutate off the thyristors 65 of the transfer switch 60. Once the fast transfer switch 60 has been opened, the slower electromechanical switch 51 may be opened to galvanically isolate the input line 22 from the connection node 61 and the bypass line 52. After the switch 51 has fully opened, the switch 54 is then closed to supply power from the second input line 26 to the junction 61 and thus to the bypass line 52. At this time, the static switch 60 is still open and the inverter 76 is still supplying power to the output line 31. After the switch 54 is fully closed, the transfer switch 60 is then closed while the inverter 76 is simultaneously turned off, so that power is now supplied from the second input line 26 to the output line 31. The additional paralleled power modules 42 shown in FIG. 2 may be operated during the switching intervals while the static switch 60 is opened to provide an adequate level of output power to the output line 31.

During a sag in voltage on the primary power input line 22 that does not reach to a fault level that would dictate switching to the secondary input power line 26, power is drawn from both of the input lines 22 and 26 via the rectifiers 69 and 70 to charge the DC storage device 74 (e.g., capacitors), so that DC power is available on the DC bus 72. The inverter 76 may then be operated to provide output power through the transformer 78 to the power module output node 64 at the same phase and frequency as the power originally provided through the transfer switch 60 from the input line 22, and the transfer switch 60 may be opened, to provide output power to the output terminal 30 and the output line 31 at the desired nominal output voltage level.

With reference to FIG. 3, an exemplary circuit embodying the switching system 10 and its control is illustrated. In this illustrative embodiment, power is supplied to the primary input line 22 from a single phase secondary 90 coupled to the primary 91 of a transformer connected to the AC input bus 17. Power is supplied to the other input line 26 from a single phase secondary 92 of a transformer having a primary 93 which is connected to the second AC input bus 18. The two secondaries 90 and 92 are connected together at a node 96 to which the neutral line 80 is connected. The power on the first input line 22 is provided on the line 43 to the rectifier 69. The rectifier 69 is composed of diodes 97 and 98 connected together and to the input line 43 at a node 99, and the series connected diodes 97 and 98 are connected across DC bus lines 72. The power on the line 26 is provided via the line 45 to the rectifier 70, which is composed of diodes 101 and 102 connected together and to the line 45 at a node 103, with the pair of diodes 101 and 102 connected across the DC bus line 72. A pair of DC bus capacitors 104 and 105 are connected together at a node 106 to which the neutral line 80 is connected, with the two capacitors 104 and 105 being connected in series across the DC bus lines 72. The single phase power provided across the secondaries 90 and 92 is rectified by the rectifying diodes 97–98 and 101–102, respectively, with a current path provided through the capacitors 104 and 105, and with the neutral line 80 providing a return line to the transformer secondaries 90 and 92. The DC power across the DC bus lines 72 is provided to an inverter 76 composed of two gate controlled static switching devices 107 and 108, e.g., insulated gate bipolar transistors (IGBTs) with anti-parallel diodes. The controlled switching devices 107 and 108 are connected together at a node 109, and provide an AC output voltage at the node 109 that is supplied via an inductor 110 to a center tap 112 of a transformer 78 which may be a boost transformer to provide a boosted voltage across the output terminals 113 and 114 of the transformer 78. The terminal 113 is connected to the output node 64, and the terminal 114 is connected to the neutral line 80. A capacitor 116 is connected across the transformer 78 to provide filtering of the output voltage from the boost transformer. To provide the capacity to ride through longer duration outages, a battery 117 may be connected across the DC bus lines 72, and a controlled switch 118 may be connected to the battery to selectively connect it to the DC bus lines 72 when needed. The battery may be charged with power from the DC bus lines 72 or from a separate charger (not shown) in a conventional manner.

Control of the operation of the power module 42 is carried out utilizing a controller that preferably includes a microprocessor and gate array 120, which provides an output signal on lines 121 to a gate driver 123. The gate driver 123 provides output signals on lines 124 to the gate controlled switching devices 107 and 108 of the inverter and on output lines 125 to the switches 65 of the static switch 60. The microprocessor 120 and the gate drive 123 receive DC supply power on lines 130 from an auxiliary power supply 131 which is connected via lines 132 and 133 to the input lines 43 and 45, respectively, which in turn are connected to the input lines 22 and 26. Thus, power will be applied across the lines 132 and 133 whenever power is available on one or both of the transformer secondaries 90 and 92. The auxiliary power supply 131 rectifies the power provided on the lines 132 and 133 to provide regulated DC power on the lines 130 and on a supply line 134 that supplies power to voltage and current sensors 136. The voltage and current sensors 136 are connected via the lines 132 and 133 to the input lines 43 and 45 to sense the voltage thereon, and via a line 140 to a node 141 to sense the voltage at the output of the transformer 78. A line 143 is connected from a current sensor 136 (e.g., a current transformer or Hall effect sensor) to the voltage and current sensors 136 to provide a signal indicative of the output current on the output line 31. The information from the voltage and current sensors in the circuit 136 is provided on signal lines 144 to the microprocessor 120. The microprocessor 120 utilizes the information obtained from the voltage and current sensors to determine when switching should occur, and provides control signals on lines 148 to the controllable electromechanical switches 51 and 54 to appropriately open and close these switches at the proper times as discussed above.

Figure 4:
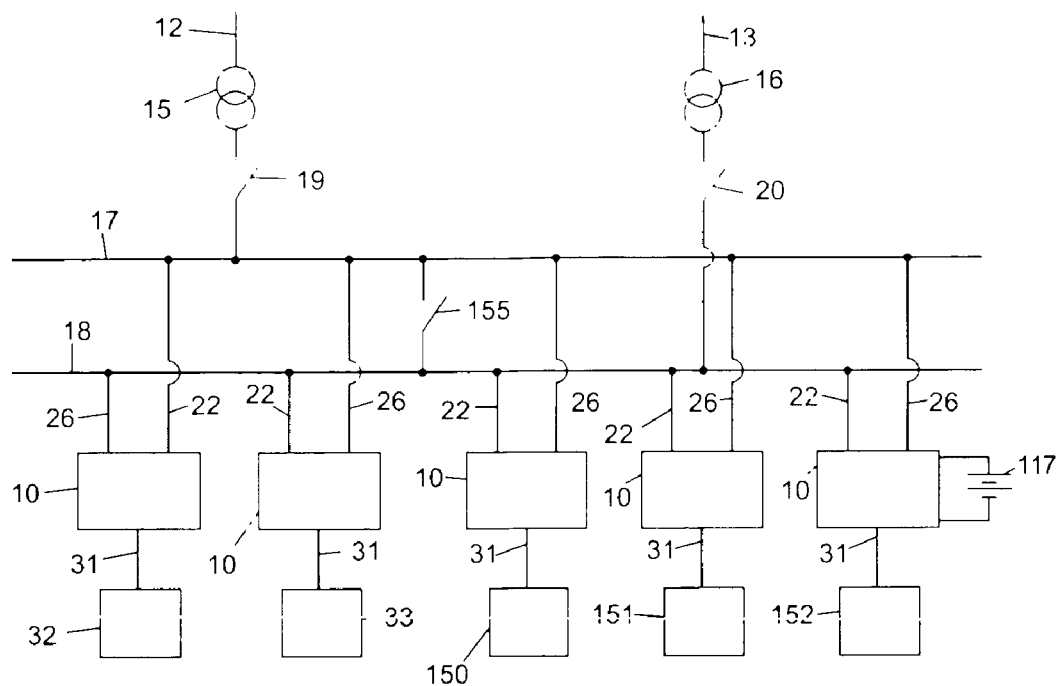
FIG. 4 is a schematic diagram of a dual feed power supply system having multiple transfer switching apparatus in accordance with the invention connected to the AC input buses to independently supply various loads from the input buses.

As illustrated in FIG. 4, multiple transfer switching apparatus 10 may be connected to the AC input bus lines 17 and 18 and can be configured to be suitable to various power protection objectives. For example, two transfer switching apparatus 10 may be connected to the input bus lines 17 and 18 to provide power to the distribution buses 32 and 33 as discussed above, but an additional switching apparatus 10 may be connected to the input buses 17 and 18 as illustrated in FIG. 4 to supply additional distribution buses shown schematically at 150, 151 and 152. The additional transfer switching apparatus 10 may draw power primarily from the first input bus 17 or the second input bus 18, as desired and as appropriate to the needs of the power consuming facility. Furthermore, the various transfer switching apparatus 10 may be configured to provide different functionality. If short-term protection of the distribution buses 32, 33, 150 and 151 is sufficient, the transfer switching apparatus supplying these buses may utilize simple capacitor energy storage for DC energy storage and have relatively low rated inverter switches and other components. However, if one of the distribution buses, e.g., the bus 152, is connected to a critical load which should be provided with sufficient power to allow it to shut down in a controlled manner even with complete power failure on both utility feeds, the transfer switching apparatus 10 connected to it may be configured to provide an uninterruptible power supply function by utilizing a battery 117, connected as discussed above, that is capable of supplying sufficient power during a power outage to allow the critical loads connected to the distribution bus 152 to operate temporarily and carry out a controlled shutdown. The inverter switches and other components in the switching apparatus 10 connected to the critical distribution bus 152 may then have higher ratings than the corresponding components on the other switching apparatus 10 to allow continuous duty cycle operation during a sustained period of operation. During a long term fault on one but not both of the main feeds 12 and 13, the switch 19 or 20 connected to the failed main can be opened and a switch 155 can be closed to connect the two input buses 17 and 18 together, allowing power to be provided through each of the switching apparatus 10 in the normal manner.

Figure 5:
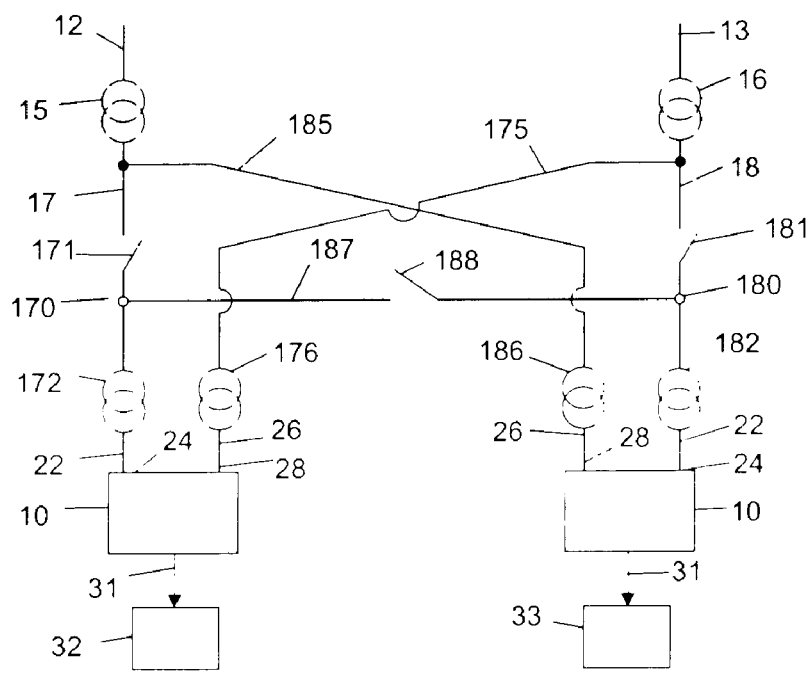
FIG. 5 is a schematic diagram of a dual feed power supply system having a medium voltage bus and multiple transfer switching apparatus connected thereto through transformers having different duty ratings.

As indicated above, the dual feed power supply system in accordance with the invention may be configured to draw power from the second input bus to compensate for sags in the voltage level on the first input bus without requiring a switchover to the second input bus. Under such circumstances, the amount of power drawn from the second input bus is usually much less than the power that is drawn from the first input bus. Furthermore, because the first input bus is intended to be the normal source of power as long as power is available, the time during which power will be supplied from the second input bus is generally relatively short. Thus, the system may be implemented with lower rated and thus lower cost components that receive power from the second input bus. One manner in which the cost of components can be reduced without affecting the functionality of the power supply system is illustrated in FIG. 5. In the power supply system of FIG. 5, the first and second input buses 17 and 18 are intermediate voltage buses, with the transformers 15 and 16 stepping down the voltage from the high voltage source lines 12 and 13 to an intermediate voltage level that is above the desired distribution bus voltage levels. The input bus 17 may be connected to a first of the transfer switching apparatus 10 via a conducting line 170, a switch 171 and a transformer 172 which reduces the voltage on the input line 22 to the desired voltage level for the distribution bus 32. The transformer 172 is rated for continuous duty. The switch 171 is normally closed so that power is supplied to the transfer switching apparatus 10 from the intermediate voltage input bus 17. The second input bus 18 is connected via a line 175 and a low or intermittent duty cycle transformer 176 to the input line 26 of the transfer switching apparatus 10 that is supplying the distribution bus 32. The low duty cycle transformer 176 steps down the voltage on the input line 18 to the desired distribution bus voltage level.

Similarly, the second transfer switching apparatus 10 that supplies the distribution bus 33 receives power from the second distribution bus 18 through a conducting line 180, a switch 181, and a continuous duty transformer 182 that steps down the voltage on the input line 18 to a voltage level suitable for the distribution bus 33. The power from the continuous duty transformer 172 is provided on the input line 22 to the first input terminal 24 of the transfer switching apparatus 10 supplying the output bus 33. A conducting line 185 connects the power on the first input bus 17 through a low voltage step-down transformer 186 to the second input line 26 and the second input terminal 28 of the transfer switching apparatus that supplies the bus 33. When the switch 181 is closed, the primary power provided to the distribution bus 33 is provided through the continuous duty transformer 182 and only low power, if any, is drawn through the low duty cycle transformer 186. A shunt line 187 is connected between the conducting lines 170 and 180 and has a switch 188 connected therein which is normally open as shown to isolate the power on the lines 170 and 180. During normal operation, the switches 171 and 181 are both closed and the switch 188 is open. If an extended power outage occurs on, for example, the high voltage feed 12, SO that power is now being provided from the second input bus 18 through the low duty cycle transformer 176 to the transfer switching apparatus 10 supplying the output bus 32, the intended duty cycle of the transformer 176 can be exceeded if the power outage lasts long enough. To avoid exceeding the rating on the low duty cycle transformer 176, at a selected time after the power outage on the main feed 12 has occurred and before the duty cycle of the transformer 176 is exceeded, the switch 171 is controlled to open and the switch 188 is closed, thus now providing primary power from the second input bus 18 through the continuous duty transformer 172 to the switching apparatus 10 and thus to the distribution bus 32. The second distribution bus 33 continues to receive power in the normal fashion from the second input bus 18 through the continuous duty cycle transformer 182. When power returns to the main feed 12, the switch 188 is opened and the switch 171 is closed to resupply power from the main utility feed 12 to the distribution bus 32. A similar sequence is carried out when power fails on the second high voltage source feed 13 by opening the switch 181 and closing the switch 188 to supply power from the utility feed 12 through the continuous duty transformer 182 and thence to the second distribution bus 33. The transitions that occur as the switches 171, 181 and 188 are opened and closed are carried out without interruption of the power provided to the distribution buses 32 and 33 by operation of the transfer switching apparatus in the manner discussed above.

Figure 6:
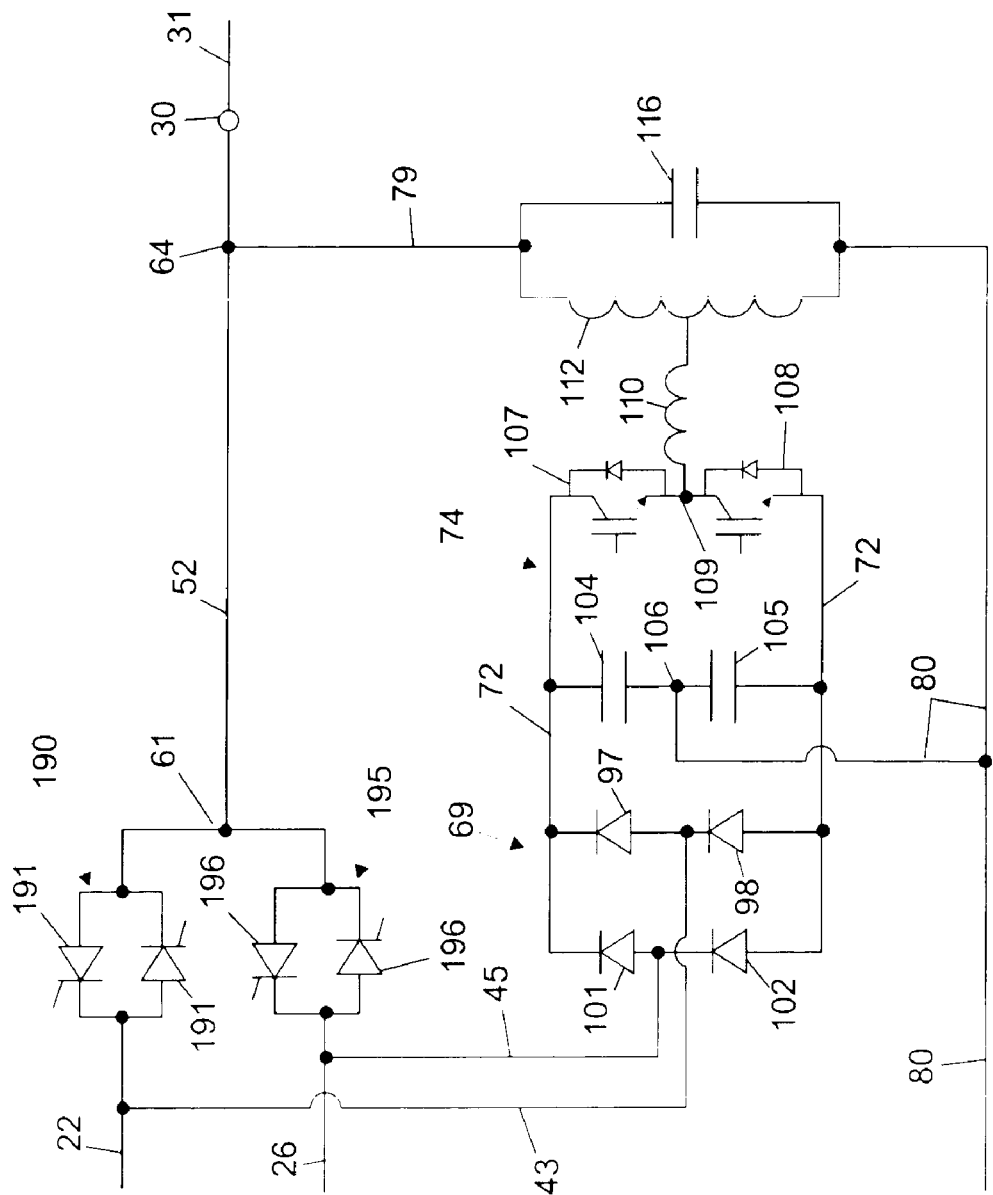
FIG. 6 is a schematic circuit diagram of a modified version of the transfer switching apparatus of the inversion.

The present invention can also be embodied in a fast sag-correcting static transfer switch apparatus as illustrated FIG. 6. The system of FIG. 6 corresponds to that of FIG. 3 with the fast transfer switch 60 of FIG. 3 removed from the conducting line 52 between the junction node 61 and the output node 64. Two separate bi-directional input switches 190 (e.g., a pair of back-to-back paralleled thyristors 191) and 195 (e.g., a pair of back-to-back paralleled thyristors 196) are connected in the input lines 22 and 26, respectively. The inverter 74 in this case provides commutation and sag-corrections for power from both of the input buses and, where the input switches 190 and 195 are formed of thyristors, provides commutation for the thyristors in both of the switches 190 and 195. The principle of operation is the same as that for the system of FIG. 3 with the (preferably) static switches 190 and 195 replacing the conventional electromechanical input switches 51 and 54 which would typically be used in the apparatus of FIG. 3. Mechanical disconnect switches (not shown in FIG. 3) may be connected in each of the lines 22 and 26 if necessary to meet applicable safety standards and the national electrical code. A maintenance bypass switch (not shown in FIG. 6) may also be included to provide a bypass similar to the switch 37 in the line 35 and the switch 40 in the line 39 in the apparatus of FIG. 2.

The transfer switching apparatus in FIG. 6 has the advantage that if the inverter 74 fails for any reason, the apparatus can continue to provide protected power within the capabilities of the switches 190 and 195, allowing switching between the sources on the lines 22 and 26 within about one-half cycle. However, if the inverter 74 is not available, transmission level sags cannot be corrected and ridethrough is not available during momentary interruptions or deep single-line faults. With the inverter available for transitioning between the two sources, the control of the static transfer switches 190 and 195 becomes less stringent, and the invention facilitates the management of such transitions to deal with typical problems encountered with thyristor-based static switches such as slow commutation under light loads and the possibility of commutation failure under certain types of faults.

It is understood that the invention is not confined to the particular embodiments set forth herein as illustrative, but embraces all such forms thereof as come within the scope of the following claims.

What is claimed is:

1. A transfer switching apparatus comprising:
   (a) a first input terminal and a second input terminal each of which may be provided with AC power from one of the lines of two separate AC input buses, and an output terminal that is available for connection to one of the lines of a distribution bus;
   (b) a first input switch connected between the first input terminal and a junction node and a second input switch connected between the second input terminal and the junction node, the input switches responsive to control signals to open and close, the first input switch being normally closed and the second input switch being normally open, and a bi-directional transfer switch connected between the junction node and the output terminal, the transfer switch responsive to control signals to open and close the transfer switch;
   (c) a first rectifier connected to the first input terminal to receive AC power therefrom and provide DC output voltage to DC bus lines and a second rectifier connected to the second input terminal to receive AC power therefrom and provide DC voltage to the DC bus lines in parallel with the DC voltage provided by the first rectifier, the first and second rectifiers connected to the first and second input terminals independently of the first and second input switches;
   (d) a DC electrical energy storage device connected to the DC bus lines to receive DC power therefrom and deliver DC power thereto; and
   (e) an inverter connected to the DC bus lines and having an AC output connected to the output terminal, the inverter responsive to control signals to provide AC output voltage to the output terminal,
   including a controller means connected to provide control signals to the first and second input switches, to the transfer switch and to the inverter, and connected to receive signals indicating the voltage at the first and second input terminals and at the output terminal, the controller means normally controlling the first and second input switches to maintain the first input switch closed and the second input switch open and controlling the transfer switch to maintain it closed during normal availability of power at the first input terminal, and upon a fault condition of the power provided to the first input terminal controlling the transfer switch to open and controlling the inverter to provide AC output power to the output terminal, then controlling the first input switch to open, then controlling the second input switch to close, then controlling the transfer switch to close to provide AC power from the second input terminal to the output terminal while controlling the inverter to turn off and cease supplying output power to the output terminal.

2. A transfer switching apparatus comprising:
   (a) a first input terminal and a second input terminal each of which may be provided with AC power from one of the lines of two separate AC input buses, and an output terminal that is available for connection to one of the lines of a distribution bus;
   (b) a first input switch connected between the first input terminal and a junction node and a second input switch connected between the second input terminal and the junction node, the input switches responsive to control signals to open and close, the first input switch being normally closed and the second input switch being normally open, and a bi-directional transfer switch connected between the junction node and the output terminal, the transfer switch responsive to control signals to open and close the transfer switch;
   (c) a first rectifier connected to the first input terminal to receive AC power therefrom and provide DC output voltage to DC bus lines and a second rectifier connected to the second input terminal to receive AC power therefrom and provide DC voltage to the DC bus lines in parallel with the DC voltage provided by the first rectifier, the first and second rectifiers connected to the first and second input terminals independently of the first and second input switches;
   (d) a DC electrical energy storage device connected to the DC bus lines to receive DC power therefrom and deliver DC power thereto; and
   (e) an inverter connected to the DC bus lines and having an AC output connected to the output terminal, the inverter responsive to control signals to provide AC output voltage to the output terminal,
   wherein the DC electrical energy storage device comprises two capacitors connected together at a node and connected in series across the DC bus lines, wherein the first and second rectifiers are formed as pairs of diodes, each connected together at a node and connected in series across the DC bus lines, the nodes between the pairs of diodes in the first and second rectifiers connected respectively to the first and second input terminals, and further including a neutral return line connected to the node between the capacitors to provide a current return path for power supplied to the first and second input terminals including a transformer for each input bus, wherein the first and second input terminals are each connected to a single phase secondary of one of the transformers having a primary connectable to AC input bus lines, wherein the single phase secondaries are connected together at a node that is connected to the neutral return line, wherein the transformer having a secondary connected to the first input terminal has a selected high duty rating and the transformer having a secondary connected to the second input terminal has a low duty rating which is less than the rating of the transformer connected to the first input terminal.

3. A dual feed power supply system comprising:
   (a) a first AC input bus and a second AC input bus each having three phase lines;
   (b) an AC distribution bus having three phase lines;
   (c) for each of the three phases of the input buses and the distribution bus, a transfer switching apparatus connected to receive power from phase lines of the AC input buses and connected to supply power to a phase line of the distribution bus, each transfer switching apparatus comprising:
      (1) a first input terminal and a second input terminal each of which is connected to be provided with AC power from one of the phase lines of the AC input buses, and an output terminal that is connected to one of the phase lines of the distribution bus;
      (2) a first input switch connected between the first input terminal and a junction node and a second input switch connected between the second input terminal and the junction node, the input switches responsive to control signals to open and close, the first input switch being normally closed and the second input switch being normally open, and a bi-directional transfer switch connected between the junction node and the output terminal, the transfer switch responsive to control signals to open and close the transfer switch;

(3) a first rectifier connected to the first input terminal to receive AC power therefrom and provide DC output voltage to DC bus lines and a second rectifier connected to the second input terminal to receive AC power therefrom and provide DC voltage to the DC bus lines in parallel with the DC voltage provided by the first rectifier, the first and second rectifiers connected to the first and second input terminals independently of the first and second input switches;

(4) a DC electrical energy storage device connected to the DC bus lines to receive DC power therefrom and deliver DC power thereto;

(5) an inverter connected to the DC bus lines and having an AC output connected to the output terminal, the inverter responsive to control signals to provide AC output voltage to the output terminal; and (6) controller means connected to provide control signals to the first and second input switches, to the transfer switch and to the inverter, and connected to receive signals indicating the voltage at the first and second input terminals and at the output terminal, the controller means normally controlling the first and second input switches to maintain the first input switch closed and the second input switch open and controlling the transfer switch to maintain it closed during normal availability of power at the first input terminal, and upon a fault condition of the power provided to the first input terminal controlling the transfer switch to open and controlling the inverter to provide AC output power to the output terminal, then controlling the first input switch to open, then controlling the second input switch to close, then controlling the transfer switch to close to provide AC power from the second input terminal to the output terminal while controlling the inverter to turn off and cease supplying output power to the output terminal.

4. The power supply system of claim 3 including a controller means connected to provide control signals to the inverter for controlling the inverter to turn on to provide AC power at the phase and frequency of the power provided from the first input terminal through the first electromechanical switch and to turn off the transfer switch when a selected level of sag occurs in the AC voltage at the first input terminal to maintain the voltage level at the output terminal at a selected nominal voltage level greater than the level of voltage available at the first input terminal.

5. The power supply system of claim 4 further including a voltage boosting auto-transformer connected between the output of the inverter and the output terminal.

6. The power supply system of claim 3 wherein the DC electrical energy storage device comprises a capacitor.

7. The power supply system of claim 3 wherein the DC electrical energy storage device comprises two capacitors connected together at a node and connected in series across the DC bus lines, wherein the first and second rectifiers are formed as pairs of diodes, each connected together at a node and connected in series across the DC bus lines, the nodes between the pairs of diodes in the first and second rectifiers connected respectively to the first and second input terminals, and further including a neutral return line connected to the node between the capacitors to provide a current return path for power supplied to the first and second input terminals.

8. The power supply system of claim 7 wherein the inverter comprises two gate controlled static switches each with anti-parallel diodes, the static switches connected together at a node and connected in series across the DC bus lines.

9. The power supply system of claim 8 wherein the static switches of the inverter are insulated gate bipolar transistors.

10. The power supply system of claim 7 including a transformer having a primary coupled to each input bus, wherein the first and second input terminals are each connected to a single phase secondary of one of the transformers, wherein the single phase secondaries are connected together at a node that is connected to a neutral return line.

11. The power supply system of claim 10 wherein the transformer having a secondary connected to the first input terminal has a selected high duty rating and the transformer having a secondary connected to the second input terminal has a low duty rating which is less than the rating of the transformer connected to the first input terminal.

12. The power supply system of claim 3 further including a boost transformer connected between the AC output of the inverter and the output terminal to provide a boost in the AC voltage from the inverter as applied to the output terminal.

13. The power supply system of claim 3 further including an inductor connected between the output of the inverter and the output terminal.

14. The power supply system of claim 3 wherein the transfer switch is a static switch comprised of anti-parallel connected thyristors.

15. The power supply system of claim 3 wherein the distribution bus is a first distribution bus, and further including a second three phase AC distribution bus, and including for each of the three phases of the second distribution bus, a transfer switching apparatus connected to receive power from the AC input buses and connected to supply power to a phase line of the second AC distribution bus, each transfer switching apparatus comprising:

(a) a first input terminal and a second input terminal each of which is provided with AC power from one of the phase lines of AC input buses, and an output terminal that is for connection to one of the phase lines of the second distribution bus;

(b) a first input switch connected between the first input terminal and a junction node and a second input switch connected between the second input terminal and the junction node, the input switches responsive to control signals to open and close, the first input switch being normally open and the second input switch being normally closed, and a bi-directional transfer switch connected between the junction node and the output terminal, the transfer switch responsive to control signals to open and close the transfer switch;

(c) a first rectifier connected to the first input terminal to receive AC power therefrom and provide DC output voltage to DC bus lines and a second rectifier connected to the second input terminal to receive AC power therefrom and provide DC voltage to the DC bus lines in parallel with the DC voltage provided by the first rectifier, the first and second rectifiers connected to the first and second input terminals independently of the first and second input switches;

(d) a DC electrical energy storage device connected to the DC bus lines to receive DC power therefrom and deliver DC power thereto;

(e) an inverter connected to the DC bus lines and having an AC output connected to the output terminal, the inverter responsive to control signals to provide AC output voltage to the output terminal;

(f) the controller means connected to provide control signals to the first and second input switches, to the transfer switch and to the inverter, and connected to receive signals indicating the voltage at the first and second input terminals and at the output terminal, the controller means normally controlling the first and second input switches to maintain the first input switch closed and the second input switch open and controlling the transfer switch to maintain it closed during normal availability of power at the first input terminal, and upon a fault condition of the power provided to the first input terminal controlling the transfer switch to open and controlling the inverter to provide AC output power to the output terminal, then controlling the first input switch to open, then controlling the second input switch to close, then controlling the transfer switch to close to provide AC power from the second input terminal to the output terminal while controlling the inverter to turn off and cease supplying output power to the output terminal.

16. The power supply system of claim 15 including a controller means for each of the transfer switching apparatus connected to supply power to the second distribution bus that is connected to provide control signals to the inverter for controlling the inverter to turn on to provide AC power at the phase and frequency of the power provided from the first input terminal through the first switch and to turn off the transfer switch when a selected level of sag occurs in the AC voltage at the second input terminal to maintain the voltage level at the output terminal at a selected nominal voltage level greater than the level of voltage available at the second input terminal.

17. The power supply system of claim 16 further including for each of the transfer switching apparatus connected to the second distribution bus a voltage boosting auto-transformer connected between the output of the inverter and the output terminal.

18. The power supply system of claim 15 wherein the DC electrical energy storage device of the transfer switching apparatus comprises a capacitor.

19. The power supply system of claim 15 wherein the DC electrical energy storage device in the transfer switching apparatus comprises two capacitors connected together at a node and connected in series across DC bus lines, wherein the first and second rectifiers are formed as pairs of diodes, each connected together at a node and connected in series across the DC bus lines, the nodes between the pairs of diodes in the first and second rectifiers connected respectively to the first and second input terminals, and further including a neutral return line connected to the node between the capacitors to provide a current return path for power supplied to the first and second input terminals.

20. The power supply system of claim 3 wherein the input switches are electromechanical switches.

21. A transfer switching apparatus comprising:
(a) a first input terminal and a second input terminal each of which may be provided with AC power from one of the lines of two separate AC input buses, and an output terminal that is available for connection to one of the lines of a distribution bus;
(b) a first input switch connected between the first input terminal and a junction node and a second input switch connected between the second input terminal and the junction node, the input switches responsive to control signals to open and close, the first input switch being normally closed and the second input switch being normally open, and a bi-directional transfer switch connected between the junction node and the output terminal, the transfer switch responsive to control signals to open and close the transfer switch;
(c) a first rectifier connected to the first input terminal to receive AC power therefrom and provide DC output voltage to DC bus lines and a second rectifier connected to the second input terminal to receive AC power therefrom and provide DC voltage to the DC bus lines in parallel with the DC voltage provided by the first rectifier, the first and second rectifiers connected to the first and second input terminals independently of the first and second input switches;
(d) a DC electrical energy storage device connected to the DC bus lines to receive DC power therefrom and deliver DC power thereto;
(e) an inverter connected to the DC bus lines and having an AC output connected to the output terminal, the inverter responsive to control signals to provide AC output voltage to the output terminal; and
(f) a controller means connected to provide control signals to the inverter for controlling the inverter to turn on to provide AC power at the phase and frequency of the power provided from the first input terminal through the first input switch and to turn off the transfer switch when a selected level of sag occurs in the AC voltage at the first input terminal to maintain the voltage level at the output terminal at a selected nominal voltage level greater than the level of voltage available at the first input terminal.

22. The apparatus of claim 21 further including a voltage boosting auto-transformer connected between the output of the inverter and the output terminal.

23. The apparatus of claim 21 wherein the DC electrical energy storage device comprises a capacitor.

24. The apparatus of claim 21 wherein the DC electrical energy storage device comprises two capacitors connected together at a node and connected in series across the DC bus lines, wherein the first and second rectifiers are formed as pairs of diodes, each connected together at a node and connected in series across the DC bus lines, the nodes between the pairs of diodes in the first and second rectifiers connected respectively to the first and second input terminals, and further including a neutral return line connected to the node between the capacitors to provide a current return path for power supplied to the first and second input terminals.

25. The apparatus of claim 24 wherein the inverter comprises two gate controlled static switches each with anti-parallel diodes, the static switches connected together at a node and connected in series across the DC bus lines.

26. The apparatus of claim 25 wherein the static switches of the inverter are insulated gate bipolar transistors.

27. The apparatus of claim 24 including a transformer for each input bus, wherein the first and second input terminals are each connected to a single phase secondary of one of the transformers having a primary connectable to AC input bus lines, wherein the single phase secondaries are connected together at a node that is connected to the neutral return line.

28. The apparatus of claim 27 wherein the transformer having a secondary connected to the first input terminal has a selected high duty rating and the transformer having a secondary connected to the second input terminal has a low duty rating which is less than the rating of the transformer connected to the first input terminal.

29. The apparatus of claim 21 further including an inductor connected between the output of the inverter and the output terminal.

30. The apparatus of claim 21 wherein the transfer switch is a static switch comprised of anti-parallel connected thyristors.

31. The apparatus of claim 21 wherein the first and second input switches are electromechanical switches.

32. A method of providing power to critical loads on a distribution bus from dual power feeds providing power to two AC input buses, comprising:

(a) when acceptable power is provided on a first of the AC input buses transmitting the power from each phase line of the first AC input bus through a first input switch and a fast transfer switch to each of the phase lines of the distribution bus;

(b) when a power failure occurs on the first AC input bus, opening the transfer switch to shut off power from the first input bus to the distribution bus and providing power from an inverter to each phase line of the distribution bus to maintain the output voltage at the distribution bus at a desired voltage level, wherein power is provided to the inverter from a DC storage device, then opening the first input switch which is connected to the first of the AC input buses, then closing a second input switch that is connected to each of the phase lines of the second of the AC input buses to provide a power path to the transfer switch, then closing the transfer switch to provide AC power from the second AC input bus to the distribution bus while turning the inverter off to cease supplying power from the inverter to the distribution bus.

33. The method of claim 32 further including charging the DC storage device with power from either the first input bus or the second input bus, or both, when power is available on the input buses.

34. The method of claim 33 wherein the DC storage device is a capacitor and power is drawn from one or both of the AC input buses and is rectified to provide a DC voltage to charge the capacitor.

35. A method of supplying power to a distribution bus from first and second AC input buses comprising:

(a) drawing power from one or both of the AC input buses when power is available thereon and rectifying the AC power to a DC voltage, and charging a DC storage device with the rectified power from the first or second AC input buses;

(b) normally providing power from the first AC input bus through a transfer switch to the distribution bus when normal power is available on the first AC input bus, and when a selected voltage sag occurs on the first AC input bus, opening the transfer switch to cut off the supply of power from the first input bus through the transfer switch to the distribution bus and turning on an inverter connected to the DC storage device to draw power therefrom, and providing an AC output voltage from the inverter to the distribution bus to maintain the voltage on the distribution bus at a selected level while simultaneously continuing to draw power from either the first AC input bus or the second AC input bus or both to charge the DC storage device.

36. The method of claim 35 wherein the DC storage device comprises a capacitor and wherein the power from one or both of the AC input buses is rectified to a DC voltage to continuously charge the capacitor.

37. A transfer switching apparatus comprising:

(a) a first input terminal and a second input terminal each of which may be provided with AC power from one of the lines of two separate AC input buses, and an output terminal that is available for connection to one of the lines of a distribution bus;

(b) a first input switch connected between the first input terminal and a junction node and a second input switch connected between the second input terminal and the junction node, the input switches responsive to control signals to open and close, the first input switch being normally closed and the second input switch being normally open, the junction node connected to the output terminal;

(c) a first rectifier connected to the first input terminal to receive AC power therefrom and provide DC output voltage to DC bus lines and a second rectifier connected to the second input terminal to receive AC power therefrom and provide DC voltage to the DC bus lines in parallel with the DC voltage provided by the first rectifier, the first and second rectifiers connected to the first and second input terminals independently of the first and second input switches, wherein the first and second rectifiers are formed as pairs of diodes, each connected together at a node and connected in series across the DC bus lines, the nodes between the pairs of diodes in the first and second rectifiers connected respectively to the first and second input terminals;

(d) a DC electrical energy storage device connected to the DC bus lines to receive DC power therefrom and deliver DC power thereto, wherein the DC electrical energy storage device comprises two capacitors connected together at a node and connected in series across the DC bus lines, and further including a neutral return line connected to the node between the capacitors to provide a current return path for power supplied to the first and second input terminals;

(e) an inverter connected to the DC bus lines and having an AC output connected to the output terminal, the inverter responsive to control signals to provide AC output voltage to the output terminal, including a bi-directional transfer switch connected between the junction node and the output terminal, and a controller means connected to provide control signals to the first and second input switches, to the transfer switch and to the inverter, and connected to receive signals indicating the voltage at the first and second input terminals and at the output terminal, the controller means normally controlling the first and second input switches to maintain the first input switch closed and the second input switch open and controlling the transfer switch to maintain it closed during normal availability of power at the first input terminal, and upon a fault condition of the power provided to the first input terminal controlling the transfer switch to open and controlling the inverter to provide AC output power to the output terminal, then controlling the first input switch to open, then controlling the second input switch to close, then controlling the transfer switch to close to provide AC power from the second input terminal to the output terminal while controlling the inverter to turn off and cease supplying output power to the output terminal.

38. A transfer switching apparatus comprising:

(a) a first input terminal and a second input terminal each of which may be provided with AC power from one of the lines of two separate AC input buses, and an output terminal that is available for connection to one of the lines of a distribution bus;

(b) a first input switch connected between the first input terminal and a junction node and a second input switch connected between the second input terminal and the junction node, the input switches responsive to control signals to open and close, the first input switch being normally closed and the second input switch being normally open, the junction node connected to the output terminal;

(c) a first rectifier connected to the first input terminal to receive AC power therefrom and provide DC output voltage to DC bus lines and a second rectifier connected to the second input terminal to receive AC power therefrom and provide DC voltage to the DC bus lines in parallel with the DC voltage provided by the first rectifier, the first and second rectifiers connected to the first and second input terminals independently of the first and second input switches, wherein the first and second rectifiers are formed as pairs of diodes, each connected together at a node and connected in series across the DC bus lines, the nodes between the pairs of diodes in the first and second rectifiers connected respectively to the first and second input terminals;

(d) a DC electrical energy storage device connected to the DC bus lines to receive DC power therefrom and deliver DC power thereto, wherein the DC electrical energy storage device comprises two capacitors connected together at a node and connected in series across the DC bus lines, and further including a neutral return line connected to the node between the capacitors to provide a current return path for power supplied to the first and second input terminals;

(e) an inverter connected to the DC bus lines and having an AC output connected to the output terminal, the inverter responsive to control signals to provide AC output voltage to the output terminal, including a transformer for each input bus, wherein the first and second input terminals are each connected to a single phase secondary of one of the transformers having a primary connectable to AC input bus lines, wherein the single phase secondaries are connected together at a node that is connected to the neutral return line, wherein the transformer having a secondary connected to the first input terminal has a selected high duty rating and the transformer having a secondary connected to the second input terminal has a low duty rating which is less than the rating of the transformer connected to the first input terminal.

* * * * *